(12) United States Patent
Li et al.

(10) Patent No.: US 8,731,236 B2
(45) Date of Patent: May 20, 2014

(54) SYSTEM AND METHOD FOR CONTENT PROTECTION IN A CONTENT DELIVERY NETWORK

(75) Inventors: Zhu Li, Palatine, IL (US); Jun Tian, Belle Meade, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 147 days.

(21) Appl. No.: 13/340,908

(22) Filed: Dec. 30, 2011

(65) Prior Publication Data
US 2012/0183173 A1    Jul. 19, 2012

Related U.S. Application Data

(60) Provisional application No. 61/432,985, filed on Jan. 14, 2011.

(51) Int. Cl.
| G06K 9/00 | (2006.01) |
| H04N 1/40 | (2006.01) |
| B42D 15/00 | (2006.01) |
| G09C 3/00 | (2006.01) |
| H04L 9/32 | (2006.01) |

(52) U.S. Cl.
USPC ............ 382/100; 283/113; 358/3.28; 380/54; 713/176

(58) Field of Classification Search
None
See application file for complete search history.

(56) References Cited

U.S. PATENT DOCUMENTS

| 5,870,754 A * | 2/1999 | Dimitrova et al. ................... 1/1 |
| 2006/0109283 A1* | 5/2006 | Shipman et al. ............. 345/629 |
| 2006/0187358 A1* | 8/2006 | Lienhart et al. .............. 348/661 |

OTHER PUBLICATIONS

Indyk, P., et al., "Approximate Nearest Neighbors: Towards Removing the Curse of Dimensionality," Department of Computer Sciences, Stanford University, 1998, pp. 604-613.
Lowe, D.G., "Distinctive Image Features from Scale-Invarient Keypoints," International Journal of Computer Vision, 2004, pp. 1-28.
Zhu, L., et al., "Locally Embedded Linear Subspaces for Efficient Video Indexing and Retrieval," ICME 2006, IEEE 2006, pp. 1765-1768.
Law-To, J., et al., "Video Copy Detection: A Comparative Study,"CIVR '07, Jul. 9-11 2007, Amsterdam, The Netherlands, 8 pages.

* cited by examiner

*Primary Examiner* — Nirav G Patel
(74) *Attorney, Agent, or Firm* — Slater & Matsil, L.L.P.

(57) ABSTRACT

An embodiment of an apparatus to authenticate a sequence of video frames includes a process to choose intra-frames of the sequence and sample DC components thereof to produce a set of test fingerprints. To reduce a dimensionality of the test fingerprints, the DC components of the chosen intra-frames are multiplied by a projection matrix formed of eigenvectors associated with the larger eigenvalues of a covariance matrix for a library of frames. The projected test fingerprints are compared against a reference set of fingerprints for authentication. Time-stamp spacings of the chosen intra-frames are determined, and these spacings are employed to select candidate frames for authentication in the reference set of fingerprints.

22 Claims, 7 Drawing Sheets

SYSTEM AND METHOD FOR CONTENT PROTECTION IN A CONTENT DELIVERY NETWORK

This application claims the benefit of U.S. Provisional Application No. 61/432,985, filed on Jan. 14, 2011, entitled "Real-Time Compresses Domain Video Fingerprinting and Authentication for Content Protection in CDN", the entire contents of which are incorporated herein by reference.

TECHNICAL FIELD

The present invention relates generally to systems, apparatuses and methods in a digital rights management system; and more particularly, example embodiments described herein provide for content protection in a content delivery network.

BACKGROUND

With the spread of personal computing devices and the advent of digital media, there is increased concern of copyright owners to limit the distribution of copyrighted materials. The use of digital media allows users to easily share and distribute the copyrighted materials, such as music, movies, and the like. As users distribute the digital media, the copyright owners lose income from sales and/or licenses.

In an attempt to limit the distribution, access control technologies, e.g., digital rights management ("DRM"), have evolved. Access control technologies attempt to limit the distribution or the use of the copyrighted materials to only those individuals who have a purchased/licensed the materials and therefore have a right to use the materials (e.g., play the music or movie).

One attempt to limit use and/or distribution includes a key authentication approach. Generally, a key authentication approach limits the use of copyrighted materials to only those machines that possess a proper decryption key. The key authentication approach, however, is vulnerable to an attack on the key.

Another approach is the use of digital watermarks. Digital watermarks are digital signatures that are added to the media during production or distribution. Digital watermarks, like the key authentication approach, are not robust and may be rendered useless.

SUMMARY OF THE INVENTION

The above-identified deficiencies and drawback of current digital rights management mechanisms are overcome through example embodiments of the present invention. For example, embodiments described herein provide for systems, methods, apparatuses and computer program products that authenticate a sequence of frames using a sampled fingerprints thereof, as described in greater detail below. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment authenticates a sequence of frames by sampling fingerprints of corresponding intra-frames representative of the sequence. If the sampled representative fingerprints match a stored profile, a user is allowed access to at least the authenticated sequence. Otherwise, access is denied.

Another example embodiment provides for apparatuses, systems, and computer program products, which are configured to implement a method of authenticating a sequence of digital picture frames comprising choosing one or more intra-frames of a specified sequence of frames. The method further includes sampling one or more zero-frequency ("DC") components of the chosen one or more intra-frames to produce a set of one or more test fingerprints. The method can then compare the set of one or more test fingerprints against a reference set of fingerprints correspondingly produced to authenticate the specified sequence of frames.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understand that these drawings depict only typical embodiments of the invention and are not therefore to be considered to be limiting of its scope. For a more complete understanding of the present invention, and the advantages thereof, reference herein is made to the following descriptions taken in conjunction with the use of the accompanying drawings, in which.

Please note, corresponding numerals and symbols in the different figures generally refer to corresponding parts unless otherwise indicated, and may not necessarily be described again in the interest of brevity.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As introduced herein, example embodiments provide for real-time video content fingerprinting and authentication, which can be used for such things as on-demand content protection and access control. In other words, example embodiments described herein provide for robust content protection with low computational cost and are flexible in a service configuration.

More specifically, one example embodiment provides fingerprint-based video content protection as a solution for access control. In such embodiment, a compressed domain processing may be employed for real-time fingerprinting of video content to produce on-demand subscription-based fingerprint verification.

As can be appreciated, this mechanism for video content protection provides fine granular content protection and access control down to a sub-minute segment level of a video or a small segment level of other material. The result is more robust content protection compared with key authentication or a watermark-based solution. Further, this example embodiment of resulting fingerprinting technique is highly resistant to tampering and corruption. As such, content can be easily fingerprinted at high efficiency by employing compressed domain processing. Furthermore, verification becomes highly efficient in computation and is easily adaptable to paralleled computation in cloud or cluster computing.

As can be appreciated, content protection is of utmost concern for content providers and content delivery network ("CDN") operators. Considering the huge amount of content that is available (e.g., COMCAST® offers more than 1.5 million titles, and Netflix® offers more than a thousand new titles every week), and the number of subscribers (e.g., COMCAST has 28 million subscribers), making the authentication system robust and operable in real time are key challenges.

As introduced herein, a highly efficient, compressed-domain video fingerprinting technology and a scalable fingerprint indexing and a robust matching scheme at an authentication server are described to address the aforementioned challenges. For example, in a typical content consumption scenario, video is downloaded from a CDN to various end-user devices. Real-time, compressed-domain video fingerprinting may be implemented at the playback terminal or at an edge server inside the CDN. More details on this fast fingerprint technology are explained later hereinbelow. Based on needs related to a user profile or content provider/CDN operator, a fingerprint authentication session can be invoked on demand, and light-weight fingerprints communicated back to a fingerprint authentication server. The fingerprint authentication server checks the fingerprints against an authentication database ("DB") that holds information on what content is authorized for which user.

In accordance with an example embodiment, real-time, compressed-domain video fingerprinting may be achieved by a logical computing processor, running either at the terminal or at a streaming and storage server in the CDN. For example, a logical computing processor may intercept content traffic and implement compressed domain fingerprinting in accordance with example embodiments described herein. For instance, a video stream may be parsed and each group of pictures ("GoP") header located, for example, by searching for a certain bit pattern. Depending on the temporal granularity that is used, the intra-frame (herein also referenced as an I-frame) header of one or more video frames may then be located and the DC components (e.g., the zero-frequency components of pixel blocks—e.g., 8×8 pixel blocks—, which can be produced by a Fast Fourier Transform or a Direct Cosine Transform) may be sampled from a video frame k to produce a vector $x_k$ of the sampled DC components. In one example embodiment, higher order frequency components are not sampled. Of course, other mechanisms for down sampling (e.g., random, ordered, etc.) are also contemplated herein.

Thereafter, the vectors $x_k$ may be assembled to form a matrix X. This provides 64 times down-scaling. I-frames are generally coded without reference to another frame in a frame sequence. Further scaling may be employed for normalization across a different video format, e.g., Common Intermediate Format ("CIF"), D1 video format (a video format initiated by Sony and Bosch) or high definition video format ("HD"), to produce the vector $x_k$ of the sampled DC components in $R^{w \times h}$ (i.e., the space of real numbers of size width w times height h) for the frame k in a certain video sequence, where the normalized icon image size is a number that is width w times height h of pixels.

In the above noted case, the computational cost may be reduced because only the DC components are recovered from the bit stream, which are generally already available in a compressed data stream. Accordingly, the computational cost is approximately $1/20$ to $1/100$ or less than that of full decoding of the sequence based on previous experience with MPEG-2-encoded systems.

In other words, example embodiments provide that the video fingerprint can be generated by sampling a set of chosen I-frames in the sequence, such as a set of randomly chosen I-frames, and collecting DC icon images that are further scaled down to a desired icon image dimension, i.e., the dimension of the vectors $x_k$ of the sampled DC components is thus reduced, and projected onto a subspace of a desired dimension d:

$$x = A \cdot f$$

In the equation above, x is an m x d icon image matrix, with m rows of icon image vectors $x_k$ of dimensionally scaled size D, which is a width times a height. An exemplary value of d is 16 and an exemplary value of D is 192. The integer m represents the number of frames that is examined in the fingerprinting process. An example value of m is 16. Generally, a larger value of m for the number of frames examined gives better accuracy but incurs more computation. The choice of a sample time stamp (as described further hereinbelow) such as produced by random sampling and the number m of frames also affects authentication accuracy.

The matrix A is a pre-trained subspace model matrix of size D x d that can offer maximum or a high level of information preserving projection for icon images in the desired d-dimensional space. This produces a compact fingerprint representation at 2d bytes per second for 30 frames per second ("fps") and a 15-frame GoP structure. For the example value of d=16, this results in only 32 bytes/sec.

The pre-trained matrix A can be a fixed matrix that can be used for a wide range of videos. To produce a pre-trained matrix A, a covariance matrix, which is a symmetric positive-semidefinite matrix of real numbers, is constructed for a reasonably broad and representative set, i.e., a library, of vectors $x_k$ of sampled DC components. The eigenvectors of the covariance matrix are determined and sorted according to their eigenvalues, from largest to smallest eigenvalue. The eigenvectors associated with the larger eigenvalues, for example the largest 16 eigenvalues, are retained to produce the columns of the matrix A.

Figure 2:
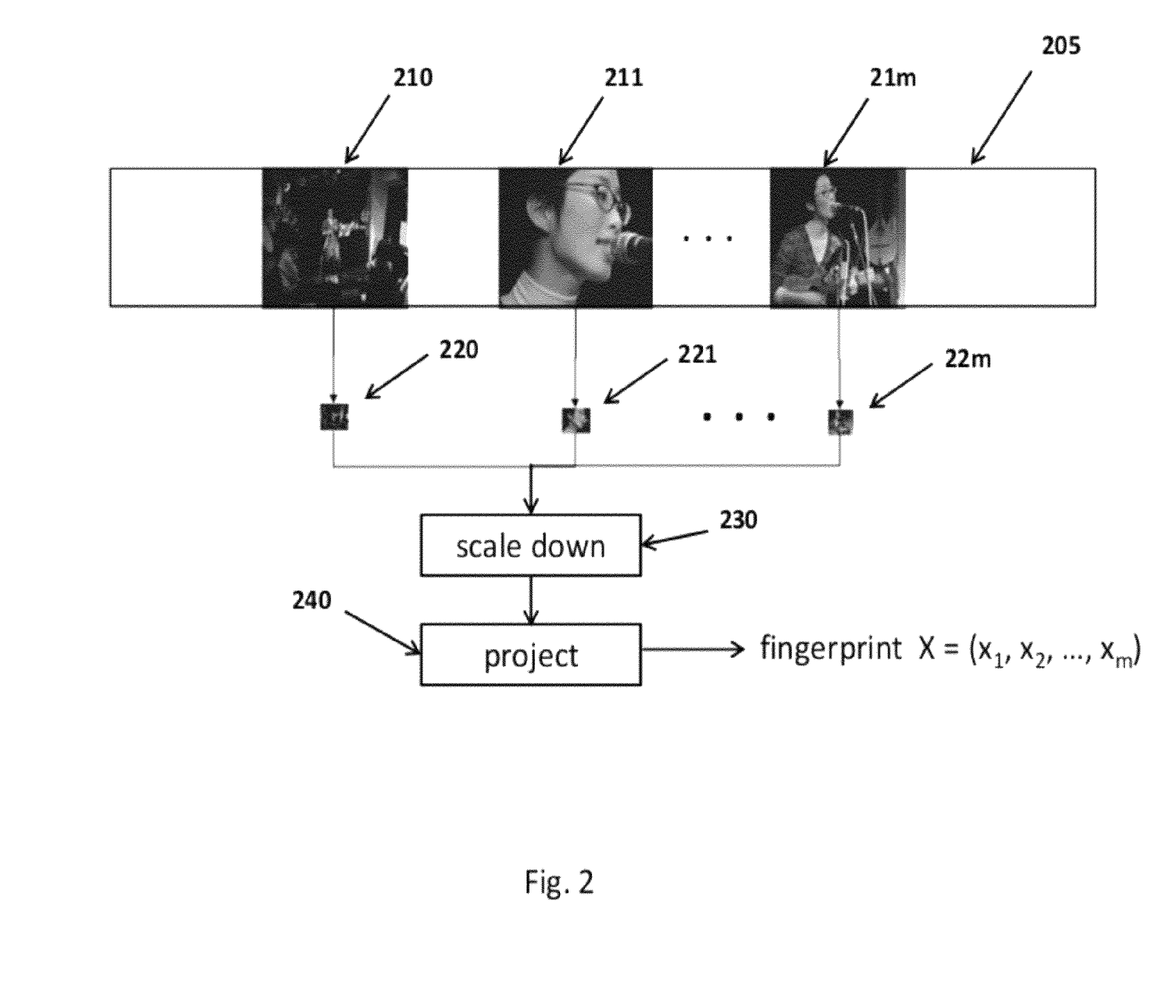
FIG. 2 illustrates an example of a real-time video fingerprinting process in accordance with example embodiments described herein.

In one embodiment, fingerprinting is implemented with the parameters D=16×12=192 and d=16. An exemplary pre-trained subspace model projection matrix A is illustrated in FIG. 2.

Accordingly, a video fingerprint is obtained by compressed domain, light-weight computing as m vectors of dimension d. The m vectors are sent to an authentication server for authentication.

To provide video fingerprint-based content authorization in a CDN cloud, an authorized content fingerprint data base (a subscription DB) is built at content injection time per a subscription plan. This offers fine granular content access control down to an individual title and chapter, or even finer. The CDN can choose to verify the content authorization at a second, lower level by issuing a command to a set-top box or mail exchanger ("MX") to extract a fingerprint and send it back to a fingerprint verification server for verification of content authorization. The system returns a yes or no response for the fingerprint with respect to the authorized content data set.

Authorization can involve an off-line authorized content indexing/search scheme. For this, a k-dimensional tree- ("k-d tree") based solution that can be very efficient for a search is developed. Basically, the CDN operator extracts a video fingerprint at the time of obtaining content from a content provider, and builds an indexed structure containing frame fingerprints in a video repository. In an embodiment, 100 hours of new content can be indexed in less than 2 minutes, and the computational cost of fingerprinting can be pegged to the content injection part. Overall computational cost is accordingly very low.

At the time of content authorization verification, a scalable solution for a fingerprint verification scheme can be used. An initial set of m test fingerprints for a stream of data such as a video stream is obtained from the client, for example a test set $\{x_1, x_2, \ldots, x_m\}$. Each fingerprint $x_k$ in the test set is searched against an indexed set of fingerprints X1 to return a set of nearest neighbors NN1. The nearest-neighbor set of fingerprints NN1 obtained from X1 is checked against a nearest neighbor set of fingerprints NN2 obtained from an indexed set X2 of fingerprints of authorized content. In an embodiment, only those nearest neighbors in NN2 having a time stamp consistent with respect to those in NN1 are examined and kept. The rest are pruned. The process is repeated until it is determined that a test fingerprint exists in the authorized data set, or that it does not exist and is not authorized. An authorization report can then be issued.

The algorithm can be performed in parallel if a cluster computer or cloud computing system is utilized. Basically there is no data dependency in write back, and the request can be easily handed off to computing resources in a cluster of processors or in a cloud.

In initial simulations, the fingerprint authentication system such as described herein demonstrates very good accuracy. Typically 98$^+$% precision is achieved on 100% recall, i.e., all copyright violations are caught, and only 2% are erroneously detected, which 2% can be submitted again. Response time is within 0.01 second for a protection subscription data set spanning a range of 1000 hours.

Figure 1:
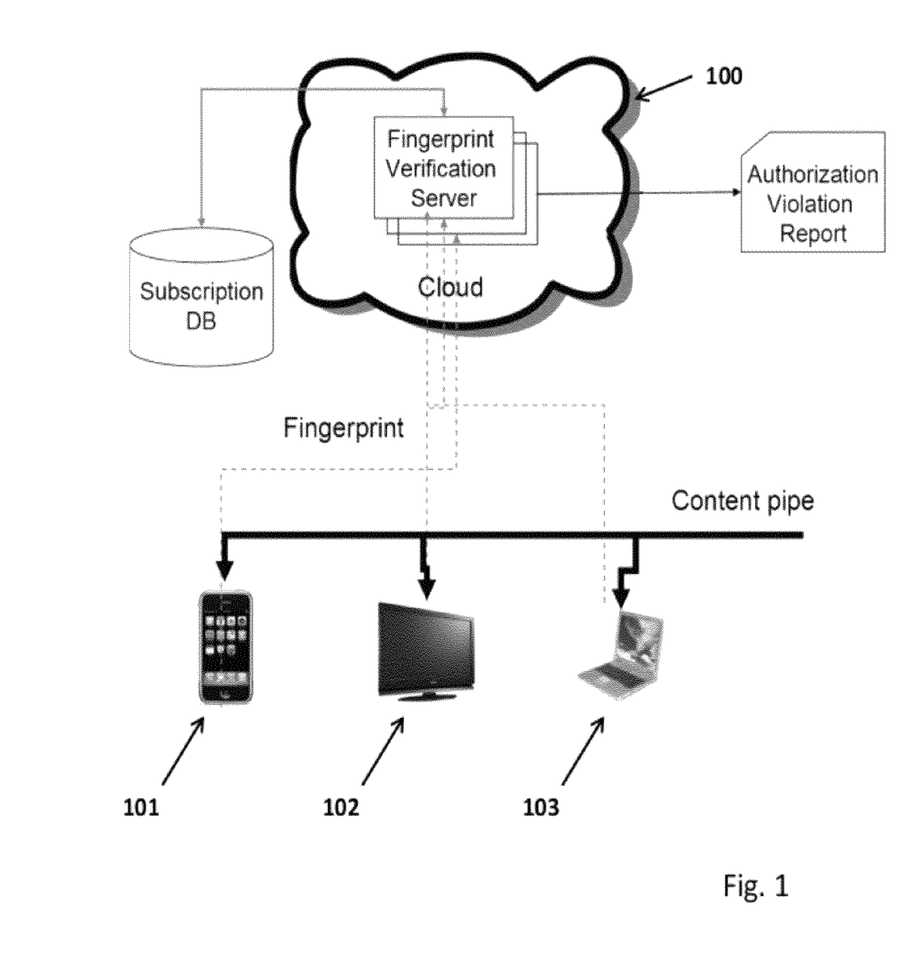
FIG. 1 illustrates an example of a fingerprint authentication system in accordance with example embodiments described herein.

Turning now to FIG. 1, which illustrates an architecture of a fingerprint authentication system in accordance with an example embodiment. As shown, a content data network (CDN) 100 provides requested content such as video through a content pipe, such as a wired or wireless Internet access connection, to end users, 101, 102, and 103. The exemplary end-users 101, 102, and 103 illustrated in FIG. 1 are, respectively, a smart phone, a personal computer, and a notebook computer. The content pipe from the CDN is illustrated in FIG. 1 with arrows. A processor in the CDN transmits fingerprints of requested content to a fingerprint verification server/processor located, e.g., in a cloud server. The fingerprint verification server/processor verifies fingerprints of the requested content with a subscription/authentication database ("subscription DB"), which includes information on what content is authorized for which user. If the subscription/authorization database authenticates the fingerprint, the fingerprint verification server allows requested content to continue to flow to the end user. On the other hand, if the fingerprint is not authenticated, an authorization violation report is produced, which generally results in interruption of the requested content for the respective user.

Turning now to FIG. 2, a real-time video fingerprinting process or method is illustrated in accordance with an example embodiment. As shown, a number m of I-frame images 210, 211, . . . , 21m of a video 205 are selected, for example, at random, by a processor to provide compressed domain fingerprinting. The intra-frame images 210, 211, . . . , 21m, which may contain 800×600 pixels, are generally encoded in pixel blocks, such as in 100×75=7500 blocks of 8×8 pixels each. The encoding produces a DC term, i.e., a zero-frequency term, which typically represents an average luminance for each 8×8 block. The collection of these DC terms forms "DC images," 120, 121, . . . , 12m of generally size 100×75=7500 pixels. The DC images may be scaled down by a processor in block 230 to reduce their dimensionality. For example, the DC images 220, 221, . . . , 22m are scaled down from 7500 pixels to a pixel resolution of 12×16=192 pixels. The scaled-down DC images appear to be a coarse-grained black-and-white picture to the human eye. The original unscaled DC images are generally scaled to a higher pixel resolution that can be of unnecessarily high dimension to produce a reliable fingerprint.

The m scaled-down dc images produced in block 230 are multiplied by the projection matrix "A" to produce a matrix X of fingerprint vectors $x_1, x_2, \ldots, x_m$, e.g., of 16 components each, for the I-frame images 210, 211, . . . , 21m.

Figure 3:
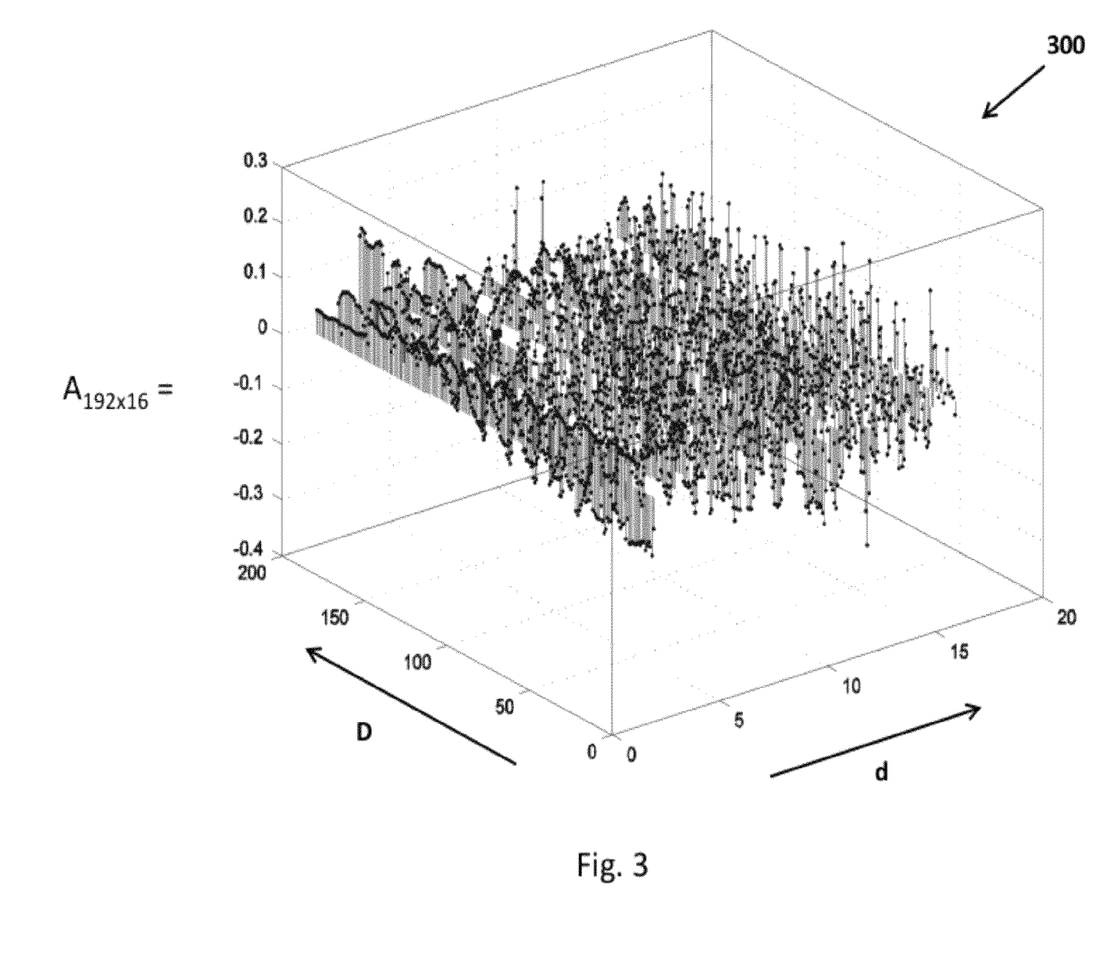
FIG. 3 illustrates a graphical representation of an example of a projection matrix in accordance with example embodiments described herein.

Turning now to FIG. 3, illustrated is an example graphical representation 300 of the projection matrix A in accordance with an example embodiment. The axis d represents an index for the m sampled frames. The axis D represents an index for training bases axes for the vectors of the 12×16=192 pixels, which are principal axes derived from the eigenvalue/eigenvector process for a covariance matrix described previously hereinabove.

Figure 4:
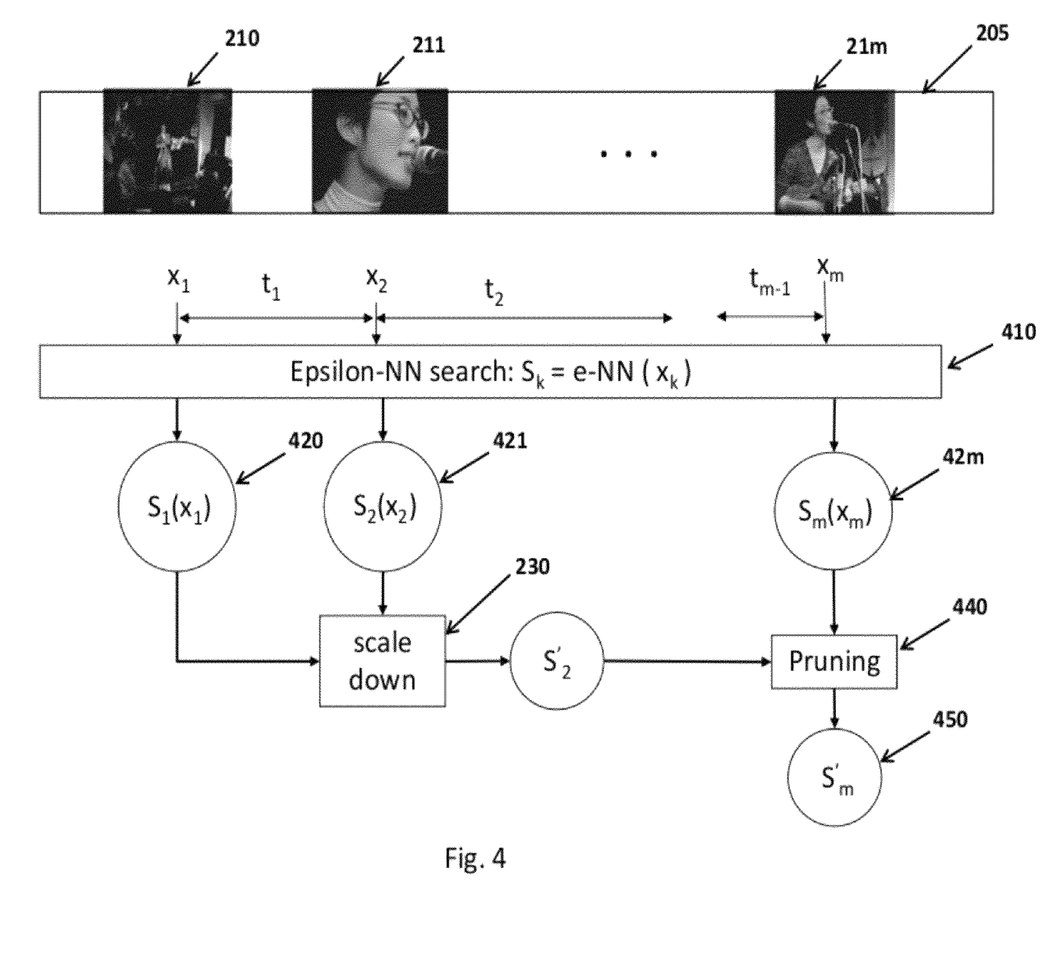
FIG. 4 illustrates a system architecture of a fingerprint authentication system in accordance with example embodiments described herein.

Turning now to FIG. 4, illustrated is an example architecture of a fingerprint authentication system for verification of a frame sequence (such as a sequence of frames in a video) against the repository, in accordance with another example embodiment. Block 410 illustrates a process executed by a processor for comparing the set of test fingerprints representing chosen I-frames 210, 211, . . . , 21m against a reference set of fingerprint to authenticate these frames. Spacings $t_1, t_2, \ldots, t_{n-1}$ of the chosen I-frames such as or derived from time stamps are used to identify members of the reference set of fingerprints having spacings or timestamps that match spacings of time stamps of the set of test fingerprints. Only fingerprint pairs with a matching time stamp difference are retained. Employing spacings or time stamps substantially reduces the number of fingerprints in the reference set of fingerprints that need to be examined for a fingerprint match.

Each individual fingerprint pulled from a query clip, $x_1$, x2, . . . , $x_m$, may be employed with an epsilon nearest-neighbor search 410 performed by a processor to retrieve candidate nearest-neighbor sets $S_1, S_2, \ldots S_m$, (420, 421, ..., 42m) which are typically hundreds of video frames in a copyright repository, and which are sequentially tested and pruned to enforce a time-stamp difference between fingerprints. Thus, nearest-neighbor sets $S_2, S_3, \ldots, S_m$ of fingerprints are iteratively pruned (in block 440) to eliminate those that do not fit time-stamp differences until there is only one or no fingerprint left in $S_m$. Then a declaration can be made for a set 450 whether a violation has been found or not.

An "epsilon" search is a search that looks for matches of a test point $S(x)$ to a data point x with an accuracy better than a given threshold epsilon. All neighbors $S(x)$ of a data point x are found for which a distance $d(x,S(x))$ is less than a threshold epsilon. Accordingly, an "epsilon" search doesn't require precise fingerprint matches.

Figure 5:
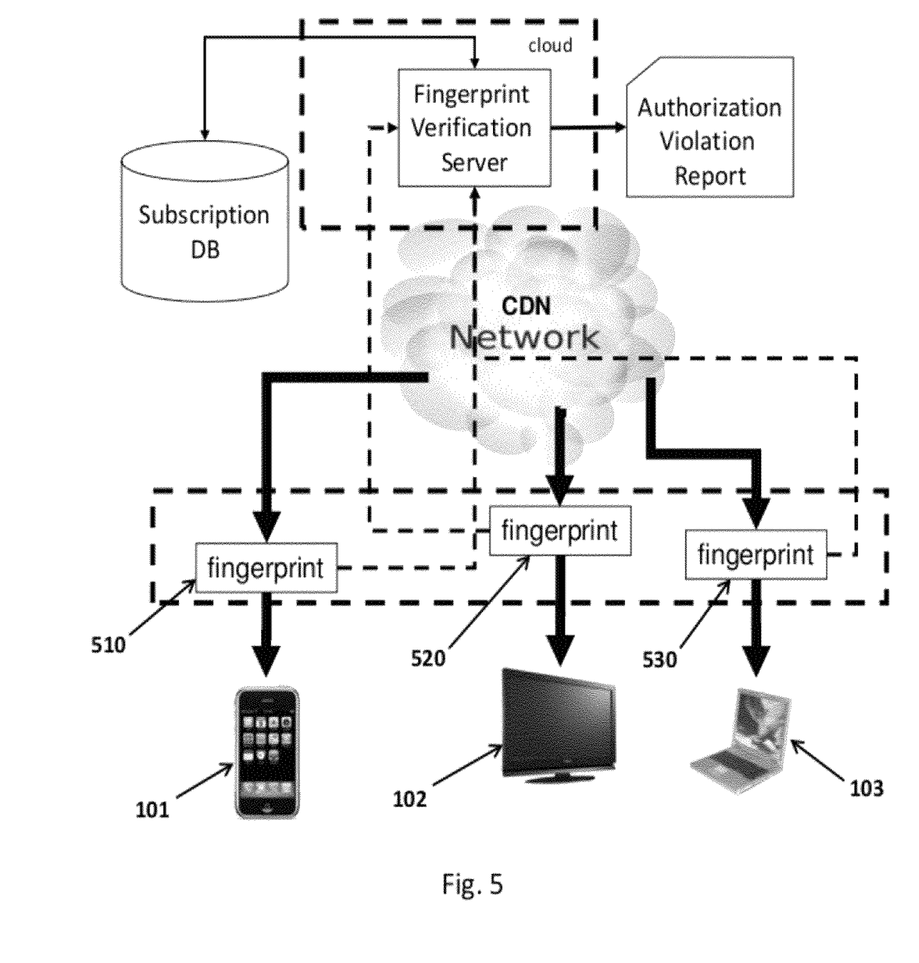
FIG. 5 illustrates a process for performing content authentication in accordance with example embodiments described herein.

FIG. 5 illustrates an example process of performing content authentication employing a fingerprint authentication system in accordance with yet another example embodiment. The process illustrated in FIG. 5 can be performed by processors in a cloud, cluster or other type of generalized networking environment and can be summarized in a few generalized steps or acts. First, real-time fingerprinting is performed, as illustrated by fingerprint-producing processes 510, 520, 530, that can include working in a compressed domain, recovering DC information from a video stream with partial decoding, and generating a compact fingerprint by scaling and projecting DC images. Second, subscription content repository indexing may be performed, which can include per subscription plan, building a content repository fingerprint and index at content injection to CDN, and can be implemented in a cloud or cluster. Then, on-demand fingerprint verification can be performed, which, if there is a suspected content authorization violation, can include pulling a fingerprint from a client or edge server, verifying the fingerprint against a subscription DB, and reporting a violation if fingerprint authentication fails, which provides fine granular, on-demand content protection.

Figure 6:
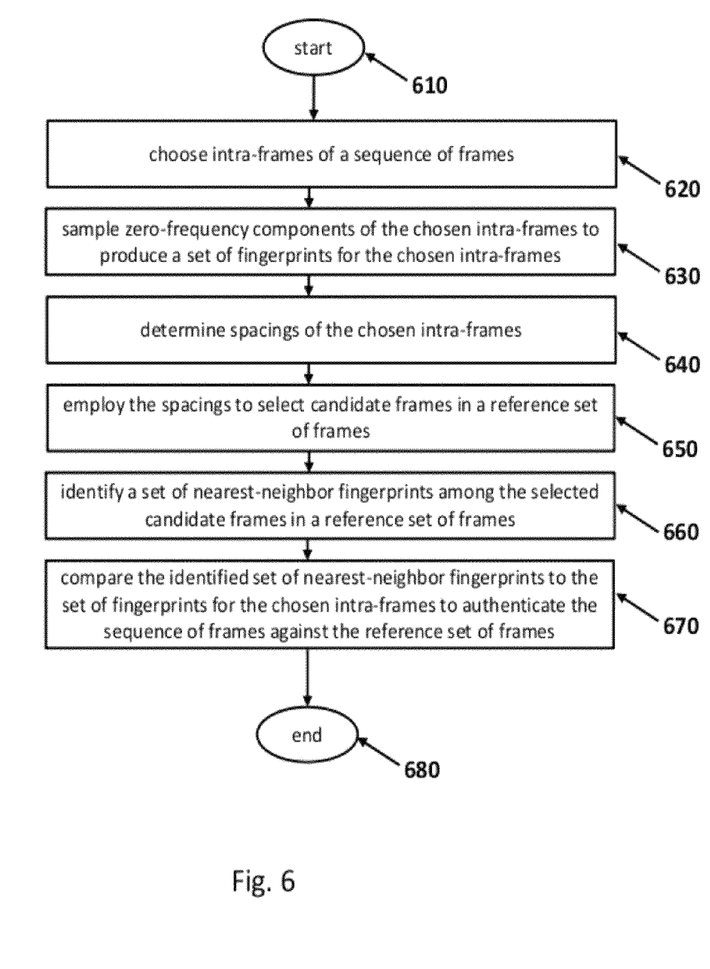
FIG. 6 illustrates a flow diagram of a method to authenticate a sequence of frames in accordance with example embodiments described herein.

Turning now to FIG. 6, illustrated is an example flow chart of a method for authenticating a sequence of frames against a reference set of frames, according to the principles of an example embodiment. The method functionally begins in a step or module 610. In step or module 620, intra-frames of the sequence of frames are chosen. In step or module 630, zero-frequency components of the chosen intra-frames are sampled to produce a set of fingerprints for the chosen intra-frames. In one particular embodiment, only the zero-frequency components of the chosen intra-frames are sampled to produce a set of fingerprints for the chosen intra-frames. In step or module 640, spacings of the chosen intra-frames are determined. In step or module 650, the spacings are employed to select candidate frames in the reference set of frames. In step or module 660, a set of nearest-neighbor fingerprints are identified among the selected candidate frames in the reference set of frames. In step or module 670, the identified set of nearest-neighbor fingerprints are compared to the set of fingerprints of the chosen intra-frames to authenticate the sequence of frames against the reference set of frames. The method functionally ends in step or module 680.

The steps or modules illustrated in FIG. 6 can be implemented on one or more processors to authenticate a sequence of frames against a reference set of frames.

Embodiments such as those presented herein provide apparatuses, systems. and methods for content authentication. For example, embodiments such as those disclosed herein can provide a fingerprint-based content authentication and protection architecture that is computationally efficient and that offers fine granular content access control down to a level of a quarter-minute segment. Furthermore, compressed domain fast fingerprinting technique that offers real-time performance and a cluster/cloud friendly architecture delivering scalable high performance fingerprint authentication on large scale can be provided by an embodiment. The resulting system and method can provide robust performance and be resistant to attack, as it is content based.

Benefits of embodiments introduced herein include robust content protection. Compared with a key authentication and watermark-based solution, embodiments using a video fingerprinting technique such as disclosed herein can be highly resistant to tampering and corruption.

Simple system architecture can be provided that provides on-demand, real-time, and flexible protection. Content can be easily fingerprinted at high efficiency due to compressed domain processing and verification is highly efficient in computation, and easy to implement and scalable with parallelized cloud/cluster computing.

Finer granularity in content protection can be provided. An embodiment can be made to work on-demand, with protection down to a quarter-minute content segment scale or better.

Embodiments such as disclosed herein can provide advantages over other types of protection, such as key-authentication-based approaches, which are vulnerable to attack on the key, while a fingerprint based approach is content based, with no need to have a key. Digital watermark-based approaches pre-insert a watermark into the content and can cause artifacts.

It is noted that, unless indicated otherwise, all functions described herein can be performed in either hardware or software, or some combination thereof, with or without human intervention. In an embodiment, the functions are performed by a processor such as a computer or an electronic data processor, such as that discussed below with reference to FIG. 7, in accordance with code such as computer program code, software, and/or integrated circuits that are coded to perform such functions, unless indicated otherwise.

Figure 7:
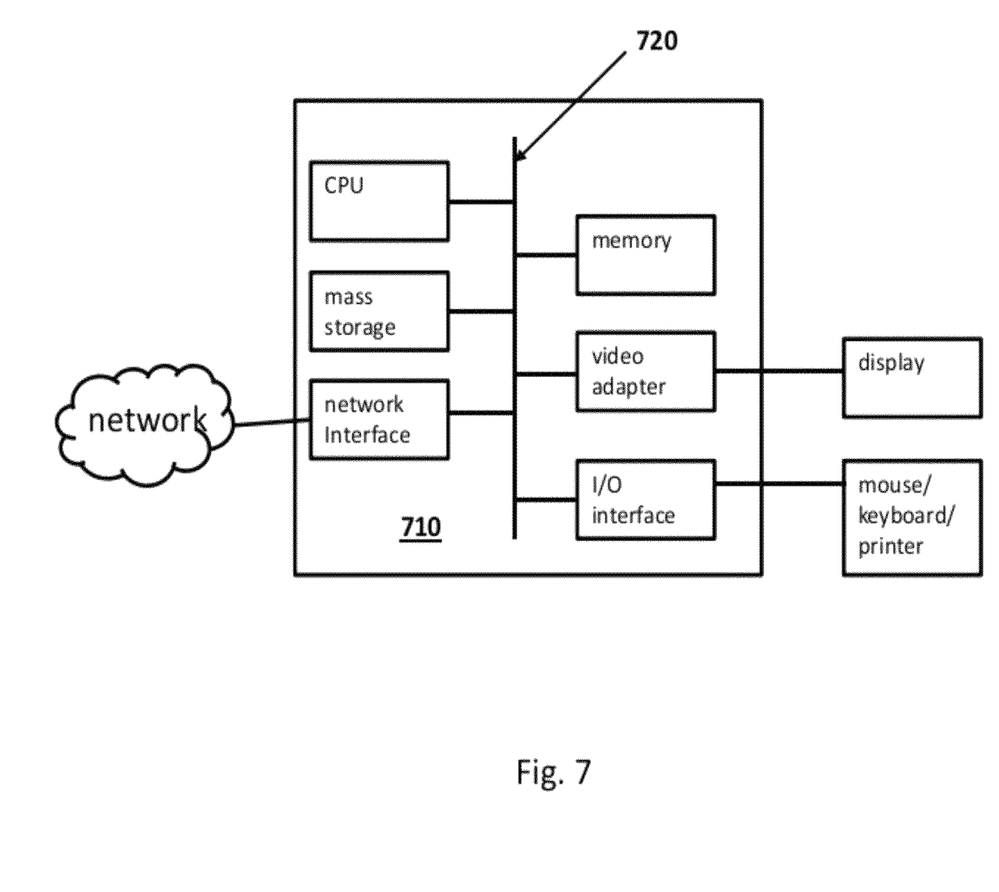
FIG. 7 illustrates a block diagram of various types of components in a generalized computing network environment that may be used to implement various embodiments described herein.

Referring now to FIG. 7, illustrated is a block diagram of elements of a processing system that may be used to perform one or more of the processes discussed hereinabove. The processing system may comprise a processor 710 equipped with one or more input/output devices, such as a mouse, a keyboard, printer, or the like, and a display. The processor 710 may include one or more central processing units (CPUs), memory, a mass storage device, a video adapter, a network interface, and an I/O interface connected to a bus 720. A plurality of processors may be employed to perform the processes discussed hereinabove.

The bus 720 may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for data storage for use while executing programs.

The mass storage device may comprise any type of storage device configured to store data, programs, and other information and to make the data, programs, and other information accessible via the bus. The mass storage device may comprise, for example, one or more of a hard disk drive, a magnetic disk drive, an optical disk drive, or the like.

The video adapter and the I/O interface provide interfaces to couple external input and output devices to the processor. Examples of input and output devices include the display coupled to the video adapter and the mouse/keyboard/printer coupled to the I/O interface. Other devices may be coupled to the processor, and additional or fewer interface cards may be utilized. For example, a serial interface card (not shown) may be used to provide a serial interface for a printer.

The processor also preferably includes a network interface, which may be a wired link, such as an Ethernet cable or the like, and/or a wireless link to enable communication with a network such as a cellular communication network. The network interface allows the processor to communicate with remote units, such as units in a cloud or elsewhere, via the network. In an embodiment, the processor is coupled to a local-area network or a wide-area network to provide communications to remote devices, such as other processors, the Internet, remote storage facilities, or the like.

It should be noted that the processing system may not include all of the components, or may include other components. For example, the processing system may include power supplies, cables, a motherboard, removable storage media, cases, and the like. These other components, although not shown, are considered part of the processing system.

Embodiments such as those presented herein provide an apparatus to authenticate a sequence of frames. An embodiment includes a first processor configured to choose intra-frames of the sequence of frames, and a second processor configured to sample DC components of the chosen intra-frames to produce a set of test fingerprints. In an embodiment, a third processor is configured to compare the set of test fingerprints against a reference set of fingerprints to authenticate the sequence of frames. The third processor can be further configured to identify a set of nearest neighbor fingerprints in the reference set of fingerprints to authenticate the sequence of frames. In an embodiment, the first processor is further configured to determine spacings of the chosen intra-frames, and the third processor is configured to employ the spacings to select candidate fingerprints in the reference set of fingerprints to authenticate the sequence of frames. The spacings can be time stamps. In an embodiment, the second processor employs the spacings to select the candidate fingerprints in the reference set of fingerprints by identifying members of the reference set of fingerprints having spacings that match spacings of the set of test fingerprints. In an embodiment, choosing the intra-frames of the sequence of frames includes randomly choosing the intra-frames. In an embodiment, producing the set of fingerprints includes projecting the DC components onto a subspace. In an embodiment, the projecting the DC components includes multiplying the set of test fingerprints by a projection matrix, wherein the projection matrix is formed of eigenvectors associated with larger eigenvalues of a covariance matrix for a candidate sequence of frames.

An embodiment provides a method to authenticate a sequence of frames by choosing intra-frames of the sequence of frames and sampling zero-frequency ("DC") components of the chosen intra-frames to produce a set of test fingerprints. In an embodiment, the method further includes comparing the set of test fingerprints against a reference set of fingerprints correspondingly produced to authenticate the sequence of frames. In an embodiment, the method further includes identifying a set of nearest neighbor fingerprints in the reference set of fingerprints to authenticate the sequence of frames. In an embodiment, the method further includes determining spacings of the chosen intra-frames; and employing the spacings to select candidate frames in the reference set of fingerprints to authenticate the sequence of frames. In an embodiment, the spacings are time stamps. In an embodiment, comparing the set of test fingerprints against the reference set of fingerprints includes identifying members of the reference set of fingerprints having spacings that match spacings of the set of test fingerprints, and comparing fingerprints in the set of test fingerprints with fingerprints of the identified members to authenticate the sequence of frames. In an embodiment, choosing the intra-frames of the sequence of frames includes randomly choosing the intra-frames. In an embodiment, the method further includes scaling the sampled DC components to a lower dimension. In an embodiment, the method further includes projecting the DC components of the chosen intra-frames onto a subspace to produce the set of test fingerprints. In an embodiment, projecting the DC components includes multiplying the DC components of the chosen intra-frames by a projection matrix, and the projection matrix is formed of eigenvectors associated with larger eigenvalues of a covariance matrix for a library of frames. In an embodiment, the sequence of frames is a sequence of video frames.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A method of authenticating a sequence of frames, comprising:
    choosing one or more intra-frames from a sequence of frames;
    sampling a near zero-frequency ("DC") component of the chosen one or more intra-frames; and
    projecting the near DC components of the chosen one or more intra-frames onto a subspace to produce a set of one or more test fingerprints.

2. The method as recited in claim 1 further comprising comparing the set of one or more test fingerprints against a reference set of one or more fingerprints correspondingly produced to authenticate the sequence of frames.

3. The method as recited in claim 1 further comprising identifying a set of one or more nearest neighbor fingerprints in the reference set of one or more fingerprints to authenticate the sequence of frames.

4. The method as recited in claim 1 further comprising:
    determining spacings of the chosen one or more intra-frames; and
    employing the spacings to select candidate frames in the reference set of one or more fingerprints to authenticate the sequence of frames.

5. The method as recited in claim 4 wherein the spacings are time stamps.

6. The method as recited in claim 4 wherein the comparing the set of one or more test fingerprints against the reference set of one or more fingerprints comprises:
    identifying members of the reference set of one or more fingerprints having spacings that match spacings of the set of one or more test fingerprints; and
    comparing fingerprints in the set of one or more test fingerprints with fingerprints of the identified members to authenticate the sequence of frames.

7. The method as recited in claim 1 wherein the choosing the one or more intra-frames of the sequence of frames comprises randomly choosing the one or more intra-frames.

8. The method as recited in claim 1 further comprising scaling the sampled near DC components to a lower dimension.

9. The method as recited in claim 1 wherein the projecting the near DC components comprises multiplying the near DC components of the chosen one or more intra-frames by a projection matrix, and wherein the projection matrix is formed of eigenvectors associated with larger eigenvalues of a covariance matrix for a library of frames.

10. The method as recited in claim 1 wherein the sequence of frames is a sequence of video frames.

11. An apparatus to authenticate a sequence of frames, comprising:
 a first processor configured to choose intra-frames of the sequence of frames; and
 a second processor configured to sample DC components of the chosen intra-frames and project the DC components onto a subspace to produce a set of test fingerprints.

12. The apparatus as recited in claim 11, further comprising a third processor configured to compare the set of test fingerprints against a reference set of fingerprints to authenticate the sequence of frames.

13. The apparatus as recited in claim 12, wherein the third processor is further configured to identify a set of nearest neighbor fingerprints in the reference set of fingerprints to authenticate the sequence of frames.

14. The apparatus as recited in claim 12, wherein the first processor is further configured to determine spacings of the chosen intra-frames, and wherein the third processor employs the spacings to select candidate fingerprints in the reference set of fingerprints to authenticate the sequence of frames.

15. The apparatus as recited in claim 14, wherein the spacings are time stamps.

16. The apparatus as recited in claim 14, wherein the second processor employs the spacings to select the candidate fingerprints in the reference set of fingerprints by identifying members of the reference set of fingerprints having spacings that match spacings of the set of test fingerprints.

17. The apparatus as recited in claim 11, wherein the choosing intra-frames of the sequence of frames comprises randomly choosing the intra-frames.

18. The apparatus as recited in claim 11, wherein the projecting the DC components comprises multiplying the set of test fingerprints by a projection matrix, and wherein the projection matrix is formed of eigenvectors associated with larger eigenvalues of a covariance matrix for a candidate sequence of frames.

19. The apparatus as recited in claim 11, wherein the second processor is further configured to scale the sampled near DC components to a lower dimension.

20. The apparatus as recited in claim 11, wherein the sequence of frames is a sequence of video frames.

21. The apparatus as recited in claim 11, wherein the first processor and the second processor are a same processor.

22. The apparatus as recited in claim 12, wherein the first processor, the second processor and the third processor are a same processor.

* * * * *